Oct. 16, 1945.  J. D. BUCHANAN  2,387,006
VALVE
Filed Oct. 13, 1942  3 Sheets-Sheet 1
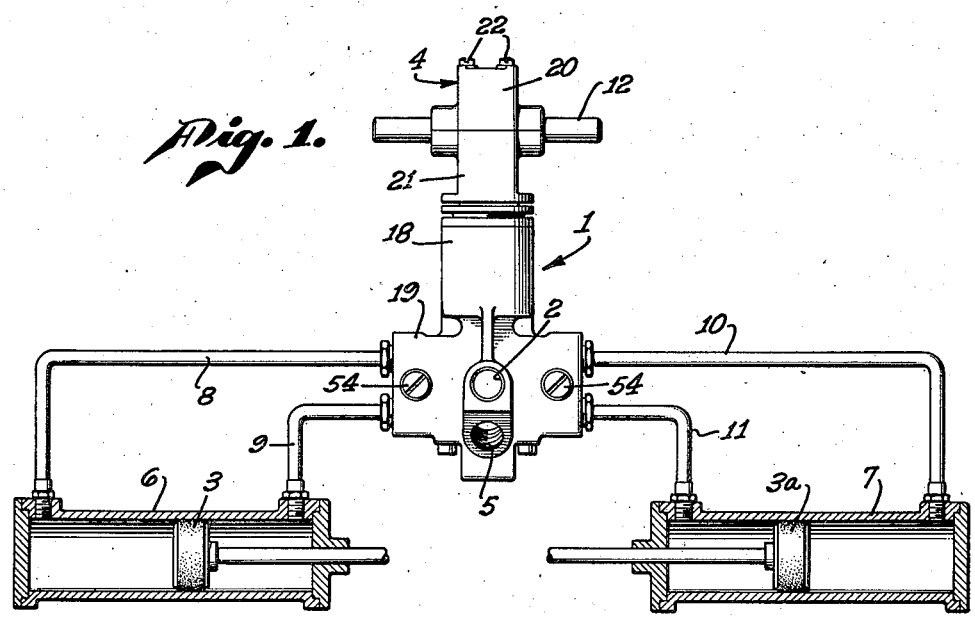
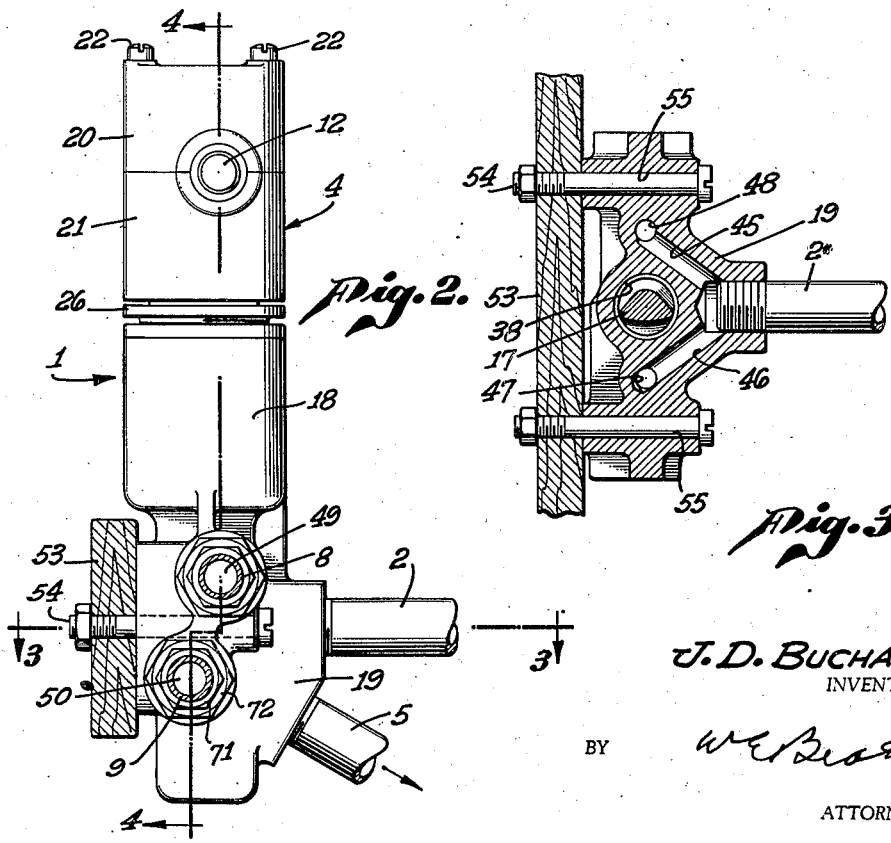
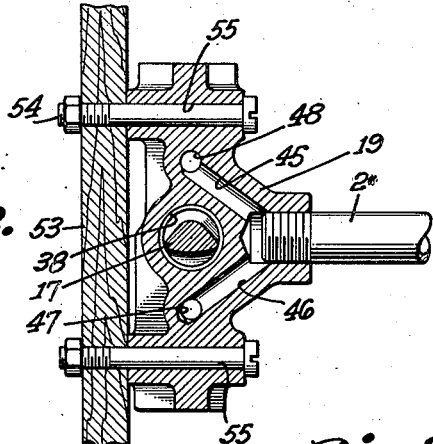
J. D. BUCHANAN,
INVENTOR.

Oct. 16, 1945.   J. D. BUCHANAN   2,387,006
VALVE
Filed Oct. 13, 1942   3 Sheets-Sheet 2
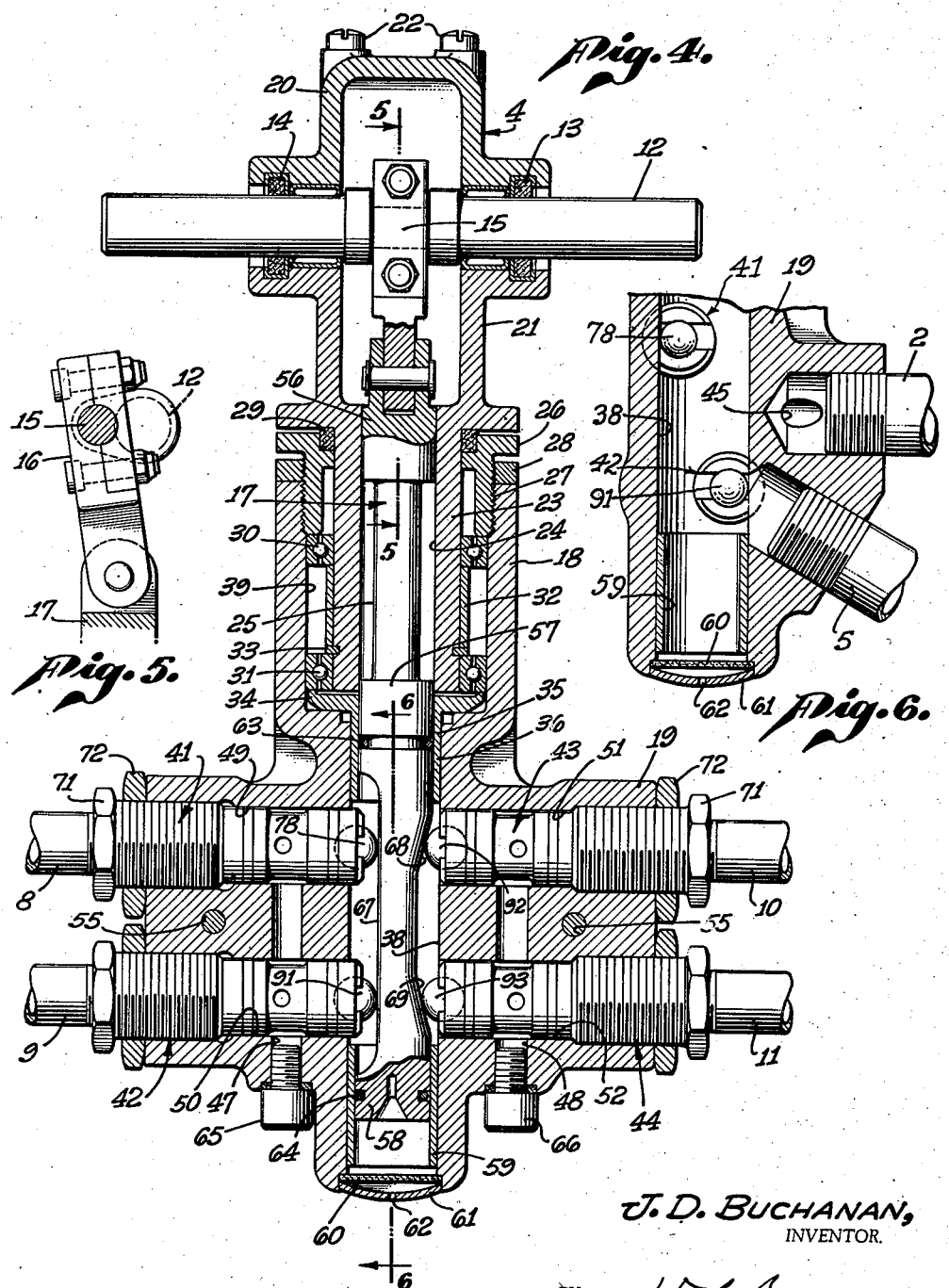
J. D. BUCHANAN,
INVENTOR.
BY
ATTORNEY.

Oct. 16, 1945.  J. D. BUCHANAN  2,387,006
VALVE
Filed Oct. 13, 1942  3 Sheets-Sheet 3

J. D. BUCHANAN,
INVENTOR.

BY

ATTORNEY.

Patented Oct. 16, 1945

2,387,006

UNITED STATES PATENT OFFICE 2,387,006

VALVE

J. D. Buchanan, Burbank, Calif.

Application October 13, 1942, Serial No. 461,859

4 Claims. (Cl. 277—21)

The invention relates to a valve, and particularly to a unitary valve mechanism for controlling the operation of a pair of hydraulic pistons. It has heretofore been proposed to employ a pair of hydraulic pistons for controlling the orientation and elevation of a certain driven mechanism, with a separate valve for each piston. Also, connections are provided for admitting fluid under pressure to either side of each piston with the other side connected to exhaust.

An object of the present invention is to provide a unitary valve mechanism having a common actuating member for independently or conjointly operating a plurality of valves for admitting pressure to either side of both pistons with the other side connected to exhaust. Hence both the orientation and elevation of the driven member can be controlled by means of the common valve actuator.

Another object of the invention is to reduce the number of machined parts, and hence reduce the weight and cost of valve mechanism having a plurality of valves operated by one handle.

Another object of the invention is to simplify and improve a valve assembly which is particularly suited for use in quadruplicate in a double 4-way valve having two pairs of valved passages (one pair for each hydraulic cylinder to be controlled), a high pressure inlet, and an outlet.

Another feature of the invention relates to the provision of an improved form of restrictor for restricting the flow of high-pressure fluid through the valve.

Another feature of the invention relates to an improved valve head for a double acting cam actuator for the valves.

For further details of the invention reference may be made to the drawings wherein Fig. 1 is a front view in elevation of the improved valve mechanism connected to a pair of hydraulic cylinders shown in section.

Fig. 2 is a view in side elevation of the valve of Fig. 1, with inlet and outlet pipes added thereto, and with a pair of the cylindrical connections and a suitable support shown in section.

Fig. 3 is a sectional view on line 3—3 of Fig. 2 looking in the direction of the arrows.

Fig. 4 is an enlarged sectional view on the broken line 4—4 of Fig. 2 looking in the direction of the arrows.

Fig. 5 is a partial sectional view on line 5—5 of Fig. 4 looking in the direction of the arrows.

Fig. 6 is a sectional view on line 6—6 of Fig. 4 with the valve stem and valve removed.

Figure 7:
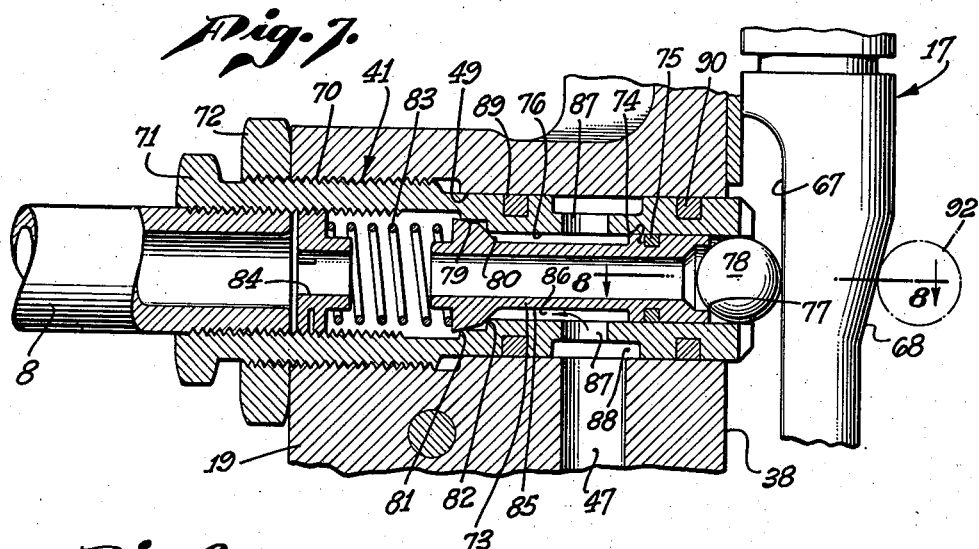
Fig. 7 is an enlarged vertical sectional view, with parts broken away, of one of the double valve units, like the four double valve units shown in Fig. 4.

Referring in detail to the drawings, I provide a unitary valve 1 for separately or simultaneously admitting high-pressure fluid from the inlet 2 to either side of the two pistons 3 and 3a, and with the other side thereof connected to exhaust through the outlet 5 in the valve 1. To this end the valve 1, aside from the inlet and outlet connections 2 and 5, has two pairs of connections to the cylinders 6 and 7, namely connections 8 and 9 which lead to opposite sides of piston 3 and connections 10 and 11 which lead to opposite sides of the piston 3a. I provide a handle 12 which may partake of two kinds of movements for independently or simultaneously operating the two pairs of passages 8—9, 10—11, and for connecting either passage in such pair to the high-pressure inlet 2, with the other thereof connected to the outlet 5. The manner in which this is accomplished, will be more readily apparent in connection with the drawings. As shown in Figs. 1, 3, 4 and 6 the valve casing 19 has a vertical cylindrical bore 38 which extends from the bottom of the casing 19 through the neck 18 where this bore is enlarged as indicated at 39. The bore 38 serves to house the lower end of the double acting cam shaft or actuating member 17 and it also serves as a well into which the four double reciprocating valves 41, 42, 43 and 44 discharge, the bore or cam well 38 communicating with the outlet 5 as indicated in Fig. 6. The valve casing 19 as shown in Figs. 3 and 6 also has in a horizontal plane, two branched passages 45, 46 which connect at one end with the high-pressure inlet 2, and at their other end with the two vertical passages 47 and 48, the former intersecting the bore 49 in which the valve assembly 41 is mounted, and the bore 50 in which the valve assembly 42 is mounted, while the passage 48 intersects the bore 51 in which the valve assembly 43 is mounted and the bore 52 in which the valve assembly 44 is mounted. Fluid under pressure in the passage 47 is thus supplied to either of the two valves 41, 42 while the other thereof is serving to exhaust fluid from the low pressure side of the piston 3 which it serves. Passage 48 for a similar purpose supplies fluid under pressure to the valves 43, 44.

The valve casing 19 is suitably secured to a support indicated at 53 in Fig. 3, by means of bolts 54 passing through suitable apertures 55 at the side of the valve casing 19.

As before stated, the valves 41–44 are selectively operated in pairs by imparting two kinds of movements to the handle 12. This will now be described in further detail, with particular reference to Figs. 4 and 5.

Handle 12 can rotate on its own axis as it is supported in suitable bearings 13 and 14 in a cap 4. As the middle portion of handle 12 is offset to provide a crank 15 (Fig. 5) which is connected through a pitman 16 to the cam shaft 17, the cam shaft 17 is moved up or down when the handle 12 is rotated on its own axis in one direction or the other. Also handle 12, together with cap 4, crank 15, pitman 16 and cam shaft 17 constitute a valve head and are rotatable as a unit about a vertical central axis through valve 1 and through cam shaft 17, as cap 4 is rotatably carried by the neck 18 of the valve casing 19.

Cap 4 is split on a horizontal plane through handle 12, and its top piece 20 and bottom piece 21 are secured together by bolts 22. The bottom piece 21 of the cap 4 has a cylindrical extension 23 which extends into and concentric with the neck 18. Extension 23 has a cylindrical bore 24 in which the cam shaft 17 has a rotary and sliding fit. An intermediate portion of cam shaft 17 is cut away as indicated at 25. Extension 23 has a rotary fit in the cap 26 secured by screw threads 27 to the top of neck 18, and held in position by the lock ring 28. Suitable packing 29 is provided between the top of cap 26 and the extension 23. Between the extension 23 and the neck 18 are arranged two spaced ball-bearings 30 and 31. The bottom of cap 26 bears on the ball-bearing 30, which in turn bears on a sleeve 32 which is frictionally held to the outside of extension 33. The bottom of sleeve 32 rests on a lock ring 33 in the outside of extension 23, and lock ring 33 rests on bearing 31, while the latter rests on the enlarged upper end 34 of sleeve 35 which has a reduced section 36 fitting in the bore 38 in the valve casing 19. Thus the lock ring 33 and associated parts, prevents lengthwise or axial movement of extension 23 in either direction.

The cam shaft 17 is elongated with the upper end 56 making a rotary and sliding fit in the bore 24, the intermediate portion 57 making a rotary and sliding fit in the extension 23 and in the sleeve 35, and with the lower end 58 making a rotary and sliding fit in sleeve 59. Sleeves 35 and 59 are hardened ground and lapped steel bushings pressed in the bore 38. The bottom of bore 38 may be closed by a felt washer 60 and a cover cap 61 having a small aperture 62 to relieve the air pressure below the lower end 58 of valve stem 17. The intermediate cam shaft portion 57 may have a sealing ring 63 and the lower end 58 may have a sealing ring 64.

Figures 8, 9:
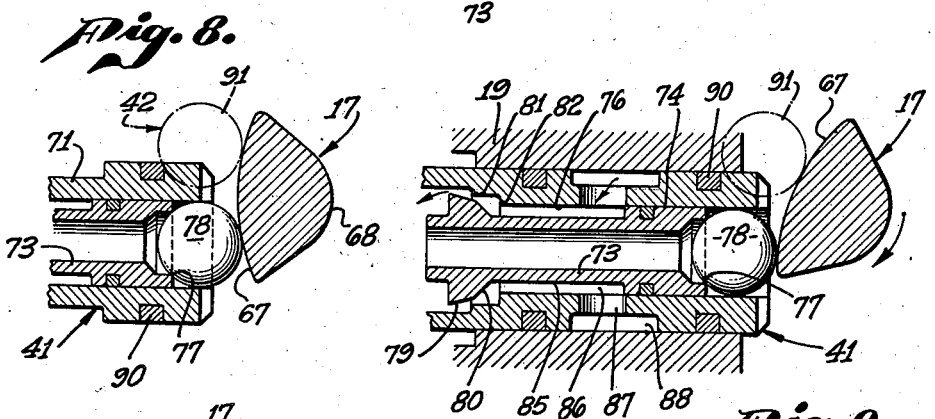
Fig. 8 is a sectional view with parts broken away, on line 8—8 of Fig. 7.
Fig. 9 is a sectional view corresponding to Fig. 8, but showing more of the valve and showing the valve in open position.

The lower end of passage 47 is sealed by a screw plug 65 and the lower end of passage 45 is sealed by a screw plug 66. Bearing in mind that the section in Fig. 4 is taken on a broken line as indicated in Fig. 2, it will be seen that the bore 49 in a horizontal plane is laterally separated namely to the right as seen in Fig. 2, with respect to the bore 50, in order to bring their respective valve assemblies 41 and 42 at different operating positions on the cam 67 which is formed on approximately the left half of the cam shaft 17 between the shaft portions 57 and 58 as seen in Fig. 4. This lateral displacement is also shown in Figs. 8 and 9. The bores 51 and 52 are in vertical alignment so as to bring their respective valve assemblies 43 and 44 in alignment with respect to the right half of the cam 67 where the latter is provided with two oppositely facing conical portions 68 and 69, the axes of these conical portions 68 and 69 being coaxial with the longitudinal axis of the cam shaft 17.

Each of the four valve assemblies 41–44 is of the same construction, and one of them, namely 41, is illustrated in detail in Fig. 7. All of these valve assemblies 41–44 are parallel, as seen in a vertical plane, and they all extend into the central bore or well 38. The outer end of the bore 49 is threaded as indicated at 70 to receive a valve cage 71 which can be adjusted lengthwise in the bore 49, it being held in adjusted position by a lock nut 72. Inside of the cage 71 is mounted a hollow tubular double acting reciprocating valve 73 having a piston 74 provided with packing 75. The piston 74 makes a sliding fit with the bore 76 at the right end of the cage 71. The tubular valve 73 at its right end is provided with a seat 77 for a ball valve 78 which closes against seat 77 to prevent fluid flow or exhaust through the inside of valve 73 into bore 38 at certain times, and valve 78 at other times is permitted to move off from its seat 77 to permit the exhaust liquid to flow through valve 73 into well 38 and then out through the outlet 5. Ball valve 78 makes a sliding fit in the bore 76. At the left end of tubular valve 73, there is provided on its exterior, an annular valve face 79 having a slight taper such as 4° or 5°, merging inwardly of the valve 73 with another valve face 80 having a greater degree of taper such as 45°. The left end of bore 76 is enlarged to provide a valve seat 82 for the valve face 80, and again enlarged to provide a valve seat 81 of larger diameter for the valve face 79. As bore 76 is enlarged at its left end to provide the valve seat 82, and as valve 80 closes this bore 76 at one side of inlet 87, with piston 74 slidable in bore 76 at the other side of inlet 87, the tubular valve 73 is balanced when valve 80 is in closed position on its seat 82.

The tubular valve 73 is, as to the valve faces 79 and 80, urged to closed position by means of the spring 83, the tension of which can be adjusted by the hollow nut 84 screw-threaded in the cage 71. Intermediate its ends, the tubular valve 73 is provided with a reduced outside diameter as indicated at 85 to provide a space 86 between it and the bore 76 to receive fluid under pressure through one or more apertures 87 in the cage 71, which communicate with an annular recess 88 on the exterior of cage 71 which communicates with the inlet passage 47. At opposite sides of the passage 47 the cage 71 is provided with packing rings 89 and 90.

When cam 67 is rotated in a clockwise direction as shown in Fig. 9 to slide ball valve 78 in bore 76 against its seat 77, the tubular valve stem 73 is thereby urged to the left to open the valves 79 and 80, to permit fluid under pressure from inlet 2 and passage 47 to pass around the valve stem 73 and then to the left to connection 8. When cam 68 is moved in a counter-clockwise direction, the valves 79 and 80 close while ball valve 78 unseats to permit fluid in connection 8 to discharge into well 38 and out through outlet 5.

It will now be described how the valve assemblies 41–44 can be selectively operated in pairs.

Figure 10:
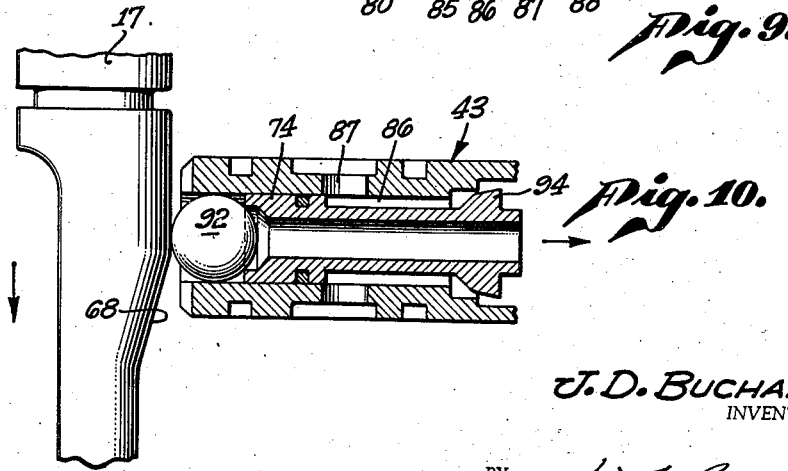
Fig. 10 is a partial vertical sectional view showing another valve in open position.

The cam 67 as indicated in Fig. 8 is convex and eccentric with respect to the longitudinal axis of the cam shaft 17, in planes at right angles to that axis while being equally distant from that axis in planes through that axis, with the result that the ball valve 78 for valve assembly 41 and the corresponding ball valve 91 for valve assembly 42 are not operated, or at least their operation is unaffected by reciprocating non-rotative movement of the cam 67. The left side of cam 67 is symmetrical about the plane of the drawings as shown in Fig. 4, that is, symmetrical about a plane at right angles to the drawings in Fig. 8. Hence with cam 67 in neutral position as shown in Fig. 8, both of the ball valves 78 and 91 are closed against their seats with the parts in the position shown in Fig. 7. As above described, cam 67 may be rocked about its axis in one direction or the other by handle 12 to open one or the other of the poppet valves such as 79 and 80 while keeping its respective ball valve 78 closed and permitting the opening of the other ball valve 91. When cam shaft 17 is in neutral position as shown in Fig. 4, ball valve 92 of valve assembly 43 contacts the center of the conical surface 68 and ball valve 93 of assembly 44 contacts the center of the oppositely facing conical surface 69. As the surfaces 68 and 69 are conical, the ball valves 92 and 93 are not affected by rotation of cam shaft 17, while downward movement of cam shaft 17 urges ball valve 92 to the right as shown in Fig. 10 to unseat its poppet valve 94, while the conical cam surface 69 at this time would permit ball valve 93 to unseat with its respective poppet valve (such as 94) closed.

It will be apparent, therefore, that through rotative movement of cam 67 the double valve assemblies 41 and 42 as a pair can be operated without operating the valve assemblies 43 and 44, and that rotation of cam 67 in one direction makes connection 8 a supply line and connection 9 an exhaust, while rotation in the other direction makes connection 9 a supply line and connection 8 an exhaust. Also cam 67 may be reciprocated but not rotated without affecting whatever relative positions assemblies 41 and 42 then have, movement in one direction serving to make connection 10 a supply line and 11 an exhaust, while straight-line movement in the other direction reverses the connections. Also the amount of rotation or longitudinal movement of cam shaft 17 determines the extent of the opening of the poppet valve such as 79, 80 and hence the amount of fluid under pressure being supplied can be adjusted. Also it is apparent that the cam 67 may have any desired rotary adjustment without disturbing the then existing longitudinal adjustment, and vice versa, or it may have simultaneous rotary and longitudinal adjustments at the same or different rates.

The taper for the valve face 79 being only four or five degrees, is so slight that it would be likely to jam in the cylindrical portion of its seat 81, and to prevent this, and also to help seal against flow to the right around the valve stem 73 as seen in Fig. 7, I provide the auxiliary valve face 80 with a greater taper such as 45° which has no tendency to jam in its seat. When the valves 79 and 80 are open as shown in Fig. 9, the flow is largely controlled through the restricted opening provided between the valve face 79 and its seat 81. While Fig. 9 shows the valve 79 and 80 in its fully opened position, if desired I may have this valve open to an extent so that valve face 80 would come opposite the other seat 81 so that the supply would first increase at a low rate, and then at a greater rate. In any event, the construction is simplified by putting the restrictor 79—81 at the outer end of the tubular valve 73.

It will be apparent that various modifications may be made in the invention without departing from the spirit of the following claims.

I claim:

1. A valve comprising a valve cage having a bore, a valve seat on the inside of said cage adjoining said bore, a tubular valve having a piston slidable in said bore and having an annular valve face cooperating with said seat, a hollow nut having a screw thread connection with the interior of said cage, a compression spring between said nut and said annular valve, the interior of said cage having screw threads for connection to a pipe, and screw threads on the exterior of said cage, a valve seat at the outer end of said piston for the interior of said valve stem, and a reciprocating valve slidable in said bore for said last mentioned seat.

2. A valve assembly comprising a casing having a bore, a removable cage in said bore, said cage having a bore coaxial with said casing bore, a tubular valve stem slidable in said cage, said valve stem having a fluid passage the full length of said stem, a cooperating valve and seat between the exterior of said stem and the interior of said cage at one end of said stem, a valve seat coaxial with said valve stem at the other end of said stem for said passage, a ball valve for said last mentioned seat in said cage bore, a cam engageable with said ball valve for urging said ball valve against its said seat to slide said stem and open said first valve, compression spring means in said cage for urging said first valve to its seat, means for longitudinally adjusting the position of said cage in said casing bore, and means for locking said cage in adjusted position.

3. A valve casing having a well, a valve assembly bore opening into said well, a valve cage removably fitting in said bore, said cage having an open outer end serving as a cylinder port, a tubular valve stem having an annular valve on the exterior thereof and cooperating with a seat on the interior of said cage, said valve stem having a coaxial exhaust passage extending the full length of said stem, a seat around said passage at the inner end of said tubular valve stem, a piston on said stem in advance of said last mentioned seat, a ball valve for said last mentioned seat, said ball valve slidably fitting the inside of said cage, a cam actuating member in said well contacting said ball valve, tensioning means in said cage for closing said first valve, and means for removably retaining said cage in said valve assembly bore, said casing and said cage having inlet ports for admitting fluid pressure between said first valve and said piston.

4. A valve comprising a casing having a bore the inner portion of which is smooth, and the outer portion of which is enlarged and provided with screw threads, a valve cage removably fitting said smooth bore and having an integral extension extending beyond said casing and having external screw threads fitting said casing threads, a lock nut on said extension, said extension having internal screw threads for a cylinder connection, and double acting reciprocating valves in said cage for controlling supply and exhaust, said cage having a supply port and an actuator for said valves.

J. D. BUCHANAN.